United States Patent [19]

Tench et al.

[11] Patent Number: 5,172,582
[45] Date of Patent: Dec. 22, 1992

[54] METHOD OF DETECTING ESCAPE OR SPILLAGE OF A COLD LIQUID

[75] Inventors: Robert B. Tench, Solihull; David M. Painter, Coventry, both of England

[73] Assignee: British Gas plc, London, England

[21] Appl. No.: 690,568

[22] Filed: Apr. 24, 1991

[30] Foreign Application Priority Data

May 10, 1990 [GB] United Kingdom ............... 9010462

[51] Int. Cl.[5] ............................................. G01M 3/28
[52] U.S. Cl. ................................. 73/40.7; 73/40.5 R
[58] Field of Search ................ 73/40.7, 40, 40.5 R, 73/49.2

[56] References Cited

U.S. PATENT DOCUMENTS

| | | | |
|---|---|---|---|
| 3,214,963 | 11/1965 | Schlumberger et al. | 73/40.7 X |
| 3,623,337 | 11/1971 | Tremont | 73/40.5 R X |
| 3,942,331 | 3/1976 | Newman, Jr. et al. | 73/40.7 X |
| 4,344,320 | 8/1982 | Haupt et al. | 73/40.7 |
| 4,404,843 | 9/1983 | Johnson et al. | 73/40.7 X |

FOREIGN PATENT DOCUMENTS

| | | | |
|---|---|---|---|
| 219533 | 11/1985 | Japan | 73/40.7 |
| 1402820 | 6/1988 | U.S.S.R. | 73/40.7 |
| 961149 | 6/1964 | United Kingdom | |

Primary Examiner—Hezron E. Williams
Assistant Examiner—Joseph W. Roskos
Attorney, Agent, or Firm—Oblon, Spivak, McClelland, Maier & Neustadt

[57] ABSTRACT

To detect escape or spillage of a cold liquid, for example liquefied natural gas, a narrow, robust, flexible, resilient, plastics tube, placed where the escaped or spilled cold liquid can contact it, is filled with carbon dioxide gas from a gas supply via a non-return valve and a pressure regulator which ensures that the maximum pressure in the tube is at a desired value which is preferably greater than the pressure of the ambient atmosphere surrounding the tube. A gas pressure drop detector is provided to observe a pressure drop in tube. Should escaped liquefied natural gas contact the tube the latter is so cooled that the carbon dioxide gas inside de-sublimates to a solid of greatly reduced volume causing a marked drop in pressure in the tube. This is observed by the pressure drop detector which initiates a warning or some safety action. A gas flow restrictor ensures the gas supply cannot rapidly re-charge the tube before the pressure drop detector has responded to the pressure drop.

20 Claims, 2 Drawing Sheets

METHOD OF DETECTING ESCAPE OR SPILLAGE OF A COLD LIQUID

BACKGROUND OF THE INVENTION

This invention relates to a method of detecting escape or spillage of a cold liquid. The invention also concerns apparatus which can be used to perform the method.

Certain substances which are gases at normal ambient pressure and temperature are cooled and liquefied to render them easier to handle or transport. Such substances may be valuable so that if there is undetected escape or spillage financial loss can occur. Also or alternatively, the inadvertent release of such a substance into the atmosphere during an escape or spillage can create a dangerous condition in which a toxic and/or smothering and/or explosive cloud or blanket of the substance in gaseous form can develop.

One such substance is liquefied natural gas, and the invention particularly, though not exclusively, concerns a method of detecting escape or spillage of liquefied natural gas.

SUMMARY OF THE INVENTION

According to a first aspect of the invention there is provided a method of detecting escape or spillage of a cold liquid into an ambient atmosphere which is at a temperature which is higher than that of the liquid, the method comprising providing a container in said atmosphere, said container having a wall through which heat is conductable, said container having an interior containing a gas which is the gaseous state of a substance which is a gas at the pressure prevailing within the container when the substance is at substantially the temperature of the ambient atmosphere, positioning said container for the escaped or spilled cold liquid to come into contact with an exterior of said container wall so cooling the wall that said substance in the container interior cools accompanied by a drop in pressure in the container interior, and observing the occurrence of said drop in pressure as indication that said escape or spillage has occurred.

The gas in said container may be supplied thereto through gas flow restrictor means which slows the flow of gas into the container from a supply of said substance.

The container may be formed of plastics material and may be a tube. The tube may be flexible.

Preferably said gas is the gaseous state of a substance which changes state to a liquid and/or solid state (of less volume than said gaseous state) when or in the course of being subjected to cooling to substantially the temperature of said cold liquid of which escape or spillage is to be detected.

The gas may be carbon dioxide.

Preferably, prior to detecting an escape or spillage of said cold liquid, the gas pressure in said container is above the pressure of said ambient atmosphere. The gas pressure in the container may be in the range of 0 to 5.0 bar gauge pressure. The container may be disposed relative to a sloping floor surface directed to run-off said cold liquid, spilled or falling thereon, into contact with said container.

According to a second aspect of the invention there is provided apparatus to detect escape or spillage of a cold liquid into an ambient atmosphere which is at a temperature which is higher than that of the liquid and said liquid being at a temperature which is lower than that of the sublimation temperature of solid carbon dioxide, said apparatus comprising a container having a wall through which heat is conductable, carbon dioxide gas supply means communicating with the interior of said container, gas pressure regulator means for limiting the maximum gas pressure in the container to a desired pre-determined value, gas pressure drop detector means for observing a drop in gas pressure in said container, and gas flow restrictor means interposed between said carbon dioxide gas supply means and said gas pressure drop detector means.

BRIEF DESCRIPTION OF THE DRAWINGS

The invention will now be further described, by way of example, with reference to the accompanying drawings in which.

DETAILED DESCRIPTION OF THE PREFERRED EMBODIMENTS

In the Figs. like references refer to like or comparable parts.

Figure 1:
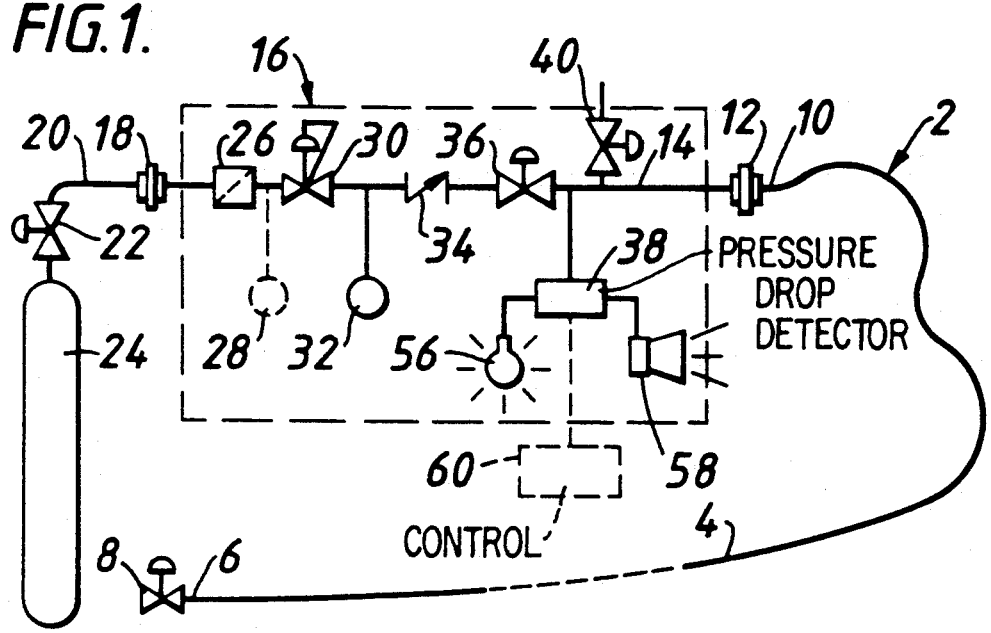
FIG. 1 is a diagrammatic representation of an embodiment of apparatus according to the second aspect of the invention for performing the method according to first aspect of the invention of detecting escape or spillage of a cold liquid.

Referring to FIG. 1, detection apparatus 2 comprises a length of narrow, flexible, robust, resilient detector tube 4 of plastics, which may be dark, for example black, in colour which at one end 6 is normally closed by a suitable openable and closable valve 8, and at its other end 10 is connected by a disconnectable coupling 12 to one end of a pipe 14 of a supply and control system 16. At its other end the pipe 14 is connected by a disconnectable coupling 18 with supply pipe 20, including a valve 22, from gaseous substance supply means 24, for example a cylinder of a compressed gas which substance at the normal ambient temperature of the atmosphere surrounding the tube 4 and at the normal pressure prevailing inside the tube 4 is a gas. The gas from the supply means 24 is used to fill the tube 4 and may be conveniently referred to as detector gas.

Heat is conductable through the wall of the detector tube 4 which may be formed of polyethelene.

The detector tube 4 can be long, for example from one end 6 to the other end 10 the detector tube can be up to substantially 150 meters in length.

The detector tube 4 may have a substantially circular cross-section, and may have an outside diameter of substantially one quarter of an inch (about 6.4 millimeters) and a wall thickness of substantially 0.040 inches (about 1.0 millimeters).

In the direction of gas flow through the supply and control system 16 from the supply 24 to the detector tube 4, the pipe 14 includes a filter 26, possibly a pressure gauge 28, a regulator valve 30, a pressure gauge 32, a non-return valve 34, gas flow restrictor means 36, pressure drop detector means 38, and a normally closed test valve 40.

The detector tube 4 is disposed in an attitude where it is most likely to be contacted by the leaking or spilled cold liquid, the escape of which liquid it is desired to detect. That cold liquid is at a temperature which is less than the temperature of the ambient atmosphere surrounding tube 4.

Figure 3:
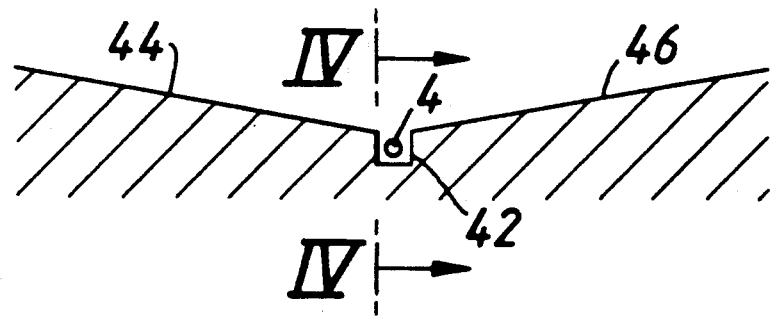
FIG. 3 shows in section, an example of one way in which the apparatus in FIG. 1 can be arranged for use.
Figure 4:
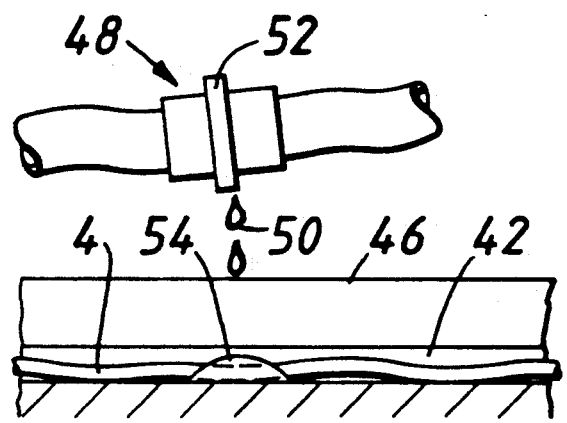
FIG. 4 is a section on line IV—IV in FIG. 3, showing the apparatus of FIG. 1 in use detecting leakage of a cold liquid, and FIG. 5 diagrammatically shows another modification which can be made to the apparatus in FIG. 1.

For example, with reference to FIG. 3, the detector tube 4 is disposed in floor channel 42 at the intersection of two sloping floor surfaces 44 and 46 inclined to one another at an obtuse angle, and over which floor the cold liquid is being stored, handled or transported. FIG. 4, for example, shows piping 48 for conveying the cold liquid, the piping being disposed above the floor 44,46.

In order to put the apparatus into a condition for detecting inadvertent release of the cold liquid, the valve 8 is opened. The valve 22 is open permanently when the gas supply means 24 is connected to the pipe 14. Thus the detector gas entering the tube 4 flushes out the latter. When this has been judged to have been done sufficiently the valve 8 is closed. Now the supply 24 fills the tube 4 with detector gas up to a desired predetermined pressure set by the regulator valve 30. The predetermined pressure can be in the range of 0 to 5 bar gauge pressure. Preferably the pressure in tube 4 should be above the pressure of the ambient atmosphere so that air cannot enter the tube through leaks. The pressure in tube 4 may preferably be in the range of 0.3 to 2.0 bar gauge pressure (5 to 30 psi).

In the event of leaking or spilled cold liquid contacting the tube 4, for example as shown in FIG. 4 where drops 50 of leaking cold liquid from a coupling 52 have collected in a pool 54 in the floor channel 42 and submerged part of the tube 4, this causes such cooling inside the tube 4 that the gas pressure therein drops. The drop in pressure is observed by the pressure drop detector means 38 causing the latter to initiate a warning and/or other action. For example the warning can be a visual warning as by illumination of a lamp 56 and/or an audible warning as by operation of sound producing means 58. Other action may be the automatic operation of apparatus storing or handling the cold liquid to reduce the risk of further escapes, for example a valve may be closed automatically to prevent more cold liquid being supplied to the piping 48; a control to cause or initiate such action is indicted at 60 arranged to receive signals from the pressure drop detector means 38.

The gas flow restrictor means 36, which may be a valve, for example a needle valve, is arranged so that when there is a fall in pressure in the tube 4 this drop in gas pressure is maintained downstream of the restrictor means 36 for at least a sufficiently long enough time for the pressure drop detector means 38 to observe and respond to the pressure drop. In other words, when there is a pressure drop in the tube 4, the gas supply 24 cannot immediately re-charge the tube because the restrictor means 36 considerably slows the gas flow into the tube 4.

The pipe 14 comprises a portion extending from the restrictor means 36 to the coupling 12. That portion of the pipe 14 preferably has a relatively small internal volume; for example the aforesaid portion may have an internal diameter substantially similar to that of the tube 4 and may be of relatively short length, for example a few centimeters. From this it follows that the length of the gas passage from the gas flow restrictor means 36 to the end 6 of the detector tube 4 can be up to substantially 150 meters in length.

Manually operable valve 40 is provided so that it can be opened, when desired, to drop the pressure in tube 4 and thus provide a test facility to see if the pressure drop detector means 38 is working.

It is preferred that the detector gas is the gaseous state of a substance which changes its state to the liquid and/or solid state when or in the course of being subjected to cooling to substantially the temperature of the cold liquid of which the leakage or spillage is to be detected. Such change in state to the liquid or solid state is accompanied by a considerable reduction in the volume of the substance when compared with the volume occupied by the gaseous state before cooling took place.

In a preferred method to detect the leakage or spillage of cold, liquefied natural gas (which at ordinary atmospheric pressure boils at substantially $-161°$ C.) the detector gas is carbon dioxide. Carbon dioxide de-sublimates (namely goes directly from the gaseous state to the solid state) at substantially $-78°$ C. accompanied by a volume decrease which reduces the volume of de-sublimated carbon dioxide to about one seven hundred-and-ninety-fourths (i.e. a reduction ratio of 1:794) of the sublime state volume. Thus if the drops 50 and pool 54 in FIG. 4 are of liquefied natural gas, the carbon dioxide in the portion of the tube 4 in the pool de-sublimes to a much smaller volume so that the pressure gradient which results causes carbon dioxide to rush along the tube to that point to also de-sublime. This causes a sudden and quite marked drop in gas pressure in the tube 4.

Carbon dioxide can be used as the detector gas to detect leakage or spillage of other cold liquids particularly if those liquids have temperatures less than $-78°$ C., for example liquid cryogens.

Figure 2:
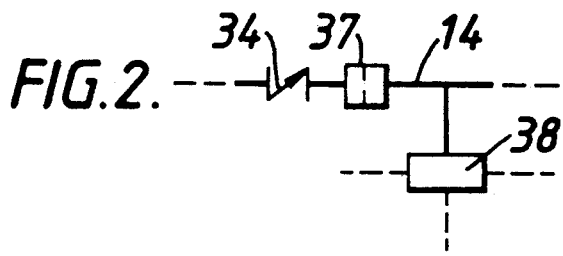
FIG. 2 diagrammatically shows a modification which can be made to the apparatus in FIG. 1.

In the modification shown in FIG. 2, an arrangement 37 having a fixed size orifice in a plate forms the restrictor means in place of the restrictor means 36 in FIG. 1.

Figure 5:
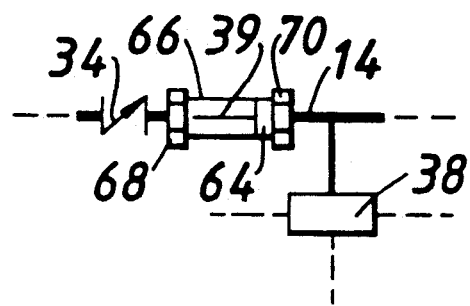

In the modification shown in FIG. 5 the restrictor means is a fine bore tube 39 which may be of metal. At one end the restrictor tube 39 is a fluid tight fit in a central bore in a disc 64 which is a fluid tight fit around its circumference in one end of a cylindrical protective sheath 66. The sheath 66 may be of metal and, as shown, may be longer than the tube 39. Spaced portions of the pipe 14 are secured to opposite ends of the sheath 66 by compression joints comprising locking nuts 68 and 70 screwed onto the sheath. In one example the tube 39 may be substantially 59 mm in length and may have an internal diameter of substantially 0.1 mm.

The apparatus described above can be made and installed relatively cheaply. It is relatively simple and can be robust.

We claim:

1. A method of detecting escape or spillage of a cold liquid into an ambient atmosphere which is at a temperature which is higher than that of the liquid, the method comprising providing a container in said atmosphere, said container having a wall through which heat is conductible, said container having an interior containing a gas which is the gaseous state of a substance which is a gas at the pressure prevailing within the container when the substance is at substantially the temperature of the ambient atmosphere, positioning said container for escaped or spilled cold liquid to come into contact with an exterior of said container wall so cooling the wall that said substance in the container interior cools accompanied by a drop in pressure in the container interior, and observing the occurrence of said drop in pressure as indication that said escape or spillage has occurred.

2. A method as claimed in claim 1, wherein said container is formed of plastics material.

3. A method as claimed in claim 1, wherein said container is a tube.

4. A method as claimed in claim 3, wherein said tube is flexible.

5. A method as claimed in claim 3, wherein said tube does not exceed substantially one hundred and fifty meters in length from gas flow restrictor means through which the tube is supplied with said gas.

6. A method as claimed in claim 3, wherein the tube has an external diameter of substantially 6.4 millimeters or less.

7. A method as claimed in claim 1, wherein said gas in said container is supplied thereto through gas flow restrictor means which slows the flow of gas into the container from a supply of said substance.

8. A method as claimed in claim 1, wherein said gas is the gaseous state of a substance which changes state to a liquid and/or solid state (of less volume than said gaseous state) when or in the course of being subjected to cooling to substantially the temperature of said cold liquid of which escape or spillage is to be detected.

9. A method as claimed in claim 1, wherein prior to detecting an escape or spillage of said cold liquid, the gas pressure inside said container is in the range of 0 to 5.0 bar gauge pressure.

10. A method as claimed in claim 1, wherein prior to detecting an escape or spillage of said cold liquid, the gas pressure inside said container is greater than that of the ambient atmosphere surrounding the container.

11. A method as claimed in claim 1, wherein said gas is carbon dioxide.

12. A method as claimed in claim 1, wherein said container is in a channel.

13. A method as claimed in claim 1, wherein said container is disposed relative to a sloping floor surface directed to run off said cold liquid, spilled or falling thereon, into contact with said container.

14. A method of detecting escape or spillage of cold liquefied natural gas as claimed in claim 1.

15. Apparatus to detect escape or spillage of a cold liquid into an ambient atmosphere which is at a temperature which is higher than that of the liquid and said liquid being at a temperature which is lower than that of the sublimation temperature of solid carbon dioxide, said apparatus comprising a container having a wall through which heat is conductable, carbon dioxide gas supply means communicating with the interior of said container, gas pressure regulator means for limiting the maximum gas pressure in the container to a desired pre-determined value, gas pressure drop detector means for observing a drop in gas pressure in said container, and gas flow restrictor means interposed between said carbon dioxide gas supply means and said gas pressure drop detector means.

16. Apparatus as claimed in claim 15, wherein said container is a flexible tube.

17. Apparatus as claimed in claim 16, wherein said tube is a plastics tube.

18. Apparatus as claimed in claim 16, wherein said gas flow restrictor means comprises a valve.

19. Apparatus as claimed in claim 16, wherein a device is provided having a fixed size orifice, and said gas flow restrictor means comprises said fixed size orifice.

20. Apparatus as claimed in claim 16, wherein said gas flow restrictor means comprises a narrow bore tube.

* * * * *